Patented May 22, 1934

1,959,363

UNITED STATES PATENT OFFICE 1,959,363

COATED MATERIAL

Horace H. Hopkins, Philadelphia, Pa., assignor to E. I. du Pont de Nemours & Company, Wilmington, Del., a corporation of Delaware No Drawing. Application August 14, 1928,
Serial No. 299,638

10 Claims. (Cl. 91—68)

This invention relates to improved floor coverings and more particularly to floor coverings coated with a synthetic resin coating composition.

In the usual practice of manufacture, certain types of floor coverings are made by the application of print paint liquids by means of a print machine to a built-up, saturated felt base, or to a linoleum base, to form a wearing and decorative surface. These print liquids generally contain, besides driers and volatile thinners, bodied or blown oils, which are blended with oleo-resinous varnishes to give products of varying degrees of gloss, hardness, flexibility, alkali resistance, and durability. Up to the time of the making of this invention it had been impossible to produce a coating on a linoleum or other floor covering which would possess the desirable qualities of quick drying, alkali resistance, and toughness of film. The coatings heretofore used possessed several serious disadvantages among which was the fact the lighter shades became markedly discolored during the usual stoving or baking process by which the coated material was dried after printing.

This invention has as an object the elimination of the difficulties heretofore encountered in the manufacture of floor coverings. A further object is to produce an improved coated floor covering which will have a surface effectively resistant to the action of soaps, soap powders, and other alkali containing materials. A further object is to produce a floor covering material having a tough, durable wearing surface. A still further object is to produce a floor covering having a wearing surface which will not become discolored during the usual baking process. Other objects will appear hereinafter.

These objects are accomplished by the following invention, which comprises coating a built-up, impregnated felt base material or a linoleum, or other base material, with a paint, the vehicle of which is a modified polyhydric alcohol-polybasic acid resin.

The coating materials used to produce the improved floor covering of this invention are what are known as "modified polyhydric alcohol-polybasic acid resins". These substances may be generally defined as the esters derived by esterifying polyhydric alcohols with mixtures of polybasic acids and suitable modifying agents such as monobasic acids derived by hydrolysis of drying or semi-drying oils respectively. The preparation of these products is described in a copending application of Hopkins and McDermott, Serial No. 129,286, filed August 14, 1926, Examples 1-5 of which are included hereinafter as Examples 2-6 of this application. Inasmuch as the properties of the modified polyhydric alcohol-polybasic acid resins vary considerably according to the ratio of the modifying oils or oil acids used, it is necessary to choose those products which are best adapted for producing flexible, quick drying and durable coatings. According to this invention, I prefer to use resins containing from 40 to 75% of oil glyceride. In the preparation of these resins it is to be noted that either the oil itself or the product obtained by the hydrolysis of these oils may be used. After the preparation of the resins they are cut with aromatic or aliphatic hydrocarbons and the desired pigment incorporated in any desired quantity to produce a print paint. The following examples will illustrate the preparation of the synthetic resins and synthetic resin print paints of this invention:

*Example 1.*—176 parts by weight of glycerol, 288 parts by weight of phthalic anhydride, 402 parts by weight of acids obtained by hydrolysis of linseed oil, and 134 parts by weight of acids obtained by hydrolysis of China wood oil are heated together in an atmosphere of carbon dioxide. The reaction is most conveniently carried out in a vessel of such shape and construction that air may be excluded from the reaction mixture, as by passing a stream of carbon dioxide through the vessel. The phthalic annydride which escapes from the hot reaction mixture may be condensed on the cool upper portion of the vessel and this sublimate may be returned to the mix by a suitable scraping device. The temperature of the mix is gradually raised to 220° C., care being taken that the evolution of steam from the reaction mixture does not become so rapid as to cause loss of material by foaming. The material is kept at 220° C., a slow stream of carbon dioxide being constantly passed through the reaction vessel in such a way as to protect the reaction mixture from the air. After 7 to 10 hours, the reaction has practically reached completion, but a small amount of free phthalic anhydride may still remain in the reaction mixture. This may be removed by bubbling a rapid stream of carbon dioxide through the molten resin maintained at a temperature of 200–220° C.

The ingredients of the resin prepared as indicated above are capable of wide variation, and the example given is to be understood as being merely illustrative. As indicated by Examples 2-6 hereof, which are taken from the above referred to Hopkins & McDermott application, additional acids, for example, such as rosin, which usually contains from 80 to 95% of abietic acid (a monobasic acid) may be included with valuable results. Instead of using acids derived by hydrolysis of drying oils, it is possible to substitute the oils themselves in the manufacture of the resins. Other polyhydric alcohols, such as glycol, may be used in place of glycerol.

Example 2.—92 parts by weight of glycerol, 148 parts by weight of phthalic anhydride, and 298 parts by weight of acids obtained by hydrolysis of linseed oil are heated together in an atmosphere of carbon dioxide in the manner indicated in Example 1.

Example 3.—92 parts by weight of glycerol, 148 parts by weight of phthalic anhydride, 142 parts by weight of linseed oil acids of acid number 197, and 175 parts by weight of rosin of acid number 160, are heated together as in Example 1, the entire preparation being carried out in exactly the same manner.

Example 4.—84 parts by weight of glycerol, 148 parts of phthalic anhydride, 150 parts of linseed oil, and 75 parts of rosin of acid #160, are added together as in Example 1, the entire preparation being carried out in exactly the same way.

Example 5.—87 parts by weight of glycerol, 148 parts by weight of phthalic anhydride, 140 parts by weight of Chinawood oil, and 175 parts by weight of rosin of acid #160 are heated exactly as described in Example 1, except that the heating at 200–220° C. is continued for only six hours, and the resulting product is not blown with carbon dioxide.

Example 6.—The glycerol may be replaced by a glycol. For example, 40 parts by weight of ethylene glycol, 100 parts by weight of phthalic anhydride and 200 parts by weight of linseed oil are heated together at 200° C. for four hours, during which carbon dioxide is passed through the reaction mixture. The temperature is then raised to 250° C. and maintained at that point for about 6 hours, continuing the stream of carbon dioxide. At the end of that time, a clear homogeneous product is obtained.

In the preparation of my resins, particularly when rosin acids are used, I have found that if air is allowed to come in contact with the hot reaction substance, a dark colored resin results. This undesirable condition may be very largely avoided by carrying out the reaction in an atmosphere of a nonoxidizing gas, such as carbon dioxide, nitrogen, hydrogen, carbon monoxide, and the like.

The print paint compositions falling within the scope of this invention may be prepared in the following manner:

Example 7.—To 100 parts by weight of the resin of Example 1, there are added 260 parts by weight of lithopone and 10 to 20 parts by weight of solvent, which may be a mixture of aromatic and aliphatic hydrocarbons or an aromatic or aliphatic hydrocarbon alone. This mixture is then ground to a suitable degree of fineness. Of course, it is to be understood that the ratios of pigment to resin or solvent may be varied at will. Likewise, other pigments and fillers may be used in place of all or part of the lithopone.

The print paint prepared as above is thinned with solvent to a printing viscosity, and is applied to the base material, such as an impregnated felt base or linoleum base, by any well-known printing process. After application in the printing machine, the goods are hung in stationary ovens and stoved at temperatures ranging from 140 to 160° F. for a period of 20 to 30 hours. The coated material is then ready for use as a floor covering.

The improved floor covering material produced as described above possesses a surface which is substantially completely resistant to the attack of soaps, soap powders, or other alkali containing materials. Another feature of the material which gives it marked superiority over the ordinary goods of this type is the fact that the polyhydric alcohol-polybasic acid resin coating is subject to practically no discoloration during the stoving process when the lighter shades are employed. Heretofore it has been practically impossible to produce a floor covering in the lighter shades, the wearing surface of which was not discolored during manufacture, but with the floor coverings of this invention this difficulty is practically eliminated. The coated surface is also tough and durable, as well as possessing the desired quality of flexibility.

By the expression "a reactive material containing drying oil acids", as used herein, I mean to include either drying oils themselves, acids obtained by the hydrolysis of drying oils, or one or more drying oil acids obtained in any other manner.

As many apparently widely different embodiments of this invention may be made without departing from the spirit thereof, it is to be understood that I do not limit myself to the foregoing examples, proportions or description except as indicated in the following patent claims.

I claim:

1. In a floor covering, the combination of a base material and a print paint decoration, the vehicle of said print paint being a polyhydric alcohol-polybasic acid resin comprising the acid radical of a drying oil, and said named components constituting substantially the entire vehicle.

2. In a floor covering, the combination of an impregnated base material and a print paint decoration containing an ester of a polyhydric alcohol and a polybasic acid and a monobasic acid obtained from a drying oil, said named components constituting substantially the entire vehicle.

3. In a floor covering, the combination of an impregnated base material and a print paint decoration containing an ester of glycerol, a polybasic acid, and acids formed by the hydrolysis of linseed oil, said named components constituting substantially the entire vehicle.

4. In a floor covering, the combination of a base material and a print paint decoration, the vehicle of said print paint being a polyhydric alcohol-polybasic acid resin containing between 40 and 75% of drying oil glyceride, and said named components constituting substantially the entire vehicle.

5. In a floor covering, the combination of a base material and a print paint decoration containing an ester of glycerol, a polybasic acid, and acids formed by the hydrolysis of linseed oil, said ester containing between 40 and 75% of oil glyceride, and said named components constituting substantially the entire vehicle.

6. In a floor covering, the combination of a base material and a print paint decoration containing an ester of glycerol, a polybasic acid, acids formed by the hydrolysis of linseed oil and acids formed by the hydrolysis of China-wood oil, and a pigment, said ester containing between 40 and 75% of oil glyceride, and said named components constituting substantially the entire vehicle.

7. In a floor covering, the combination of a base material and a print paint decoration comprising an ester of a polyhydric alcohol, a polybasic acid, a reactive material containing drying oil acids and rosin, and said named components constituting substantially the entire vehicle.

8. In a floor covering, the combination of a base material and a print paint decoration comprising an ester of glycerol, a polybasic acid, a reactive material containing drying oil acids and rosin, and said named components constituting substantially the entire vehicle.

9. The floor covering of claim 7, in which the ester contains from 40 to 75% of oil glyceride.

10. The floor covering of claim 8, in which the ester contains from 40 to 75% of oil glyceride.

HORACE H. HOPKINS.